(12) United States Patent
Singh et al.

(10) Patent No.: US 11,138,157 B2
(45) Date of Patent: Oct. 5, 2021

(54) SYSTEM AND METHOD FOR IDENTIFYING BUSINESS LOGIC AND DATA LINEAGE WITH MACHINE LEARNING

(71) Applicant: JPMorgan Chase Bank, N.A., New York, NY (US)

(72) Inventors: Jagmohan Singh, Coppell, TX (US); Suneetha Vakalapudi, Garnet Valley, PA (US); Soren Tannehill, Lewis Center, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 302 days.

(21) Appl. No.: 16/115,968

(22) Filed: Aug. 29, 2018

(65) Prior Publication Data

US 2019/0065523 A1 Feb. 28, 2019

Related U.S. Application Data

(60) Provisional application No. 62/551,923, filed on Aug. 30, 2017.

(51) Int. Cl.
| | | |
|---|---|---|
| *G06F 16/00* | (2019.01) | |
| *G06F 16/178* | (2019.01) | |
| *G06N 5/04* | (2006.01) | |
| *G06N 20/00* | (2019.01) | |
| *G06F 16/25* | (2019.01) | |

(52) U.S. Cl.
CPC ........ *G06F 16/1794* (2019.01); *G06F 16/252* (2019.01); *G06N 5/04* (2013.01); *G06N 20/00* (2019.01)

(58) Field of Classification Search
CPC .. G06F 16/1794; G06F 16/252; G06F 16/254; G06N 20/00; G06N 5/04
See application file for complete search history.

(56) References Cited

U.S. PATENT DOCUMENTS

| | | | | |
|---|---|---|---|---|
| 7,003,560 | B1* | 2/2006 | Mullen | G06Q 10/06 709/223 |
| 9,405,794 | B2* | 8/2016 | Prakash | G06F 16/24578 |
| 9,910,903 | B1* | 3/2018 | Jilani | G06F 16/254 |
| 10,509,696 | B1* | 12/2019 | Gilderman | G06F 11/3034 |
| 10,565,537 | B1* | 2/2020 | Askew | G06N 5/003 |
| 10,705,796 | B1* | 7/2020 | Doyle | G06N 5/04 |
| 2005/0027721 | A1* | 2/2005 | Saenz | G06Q 30/02 |
| 2006/0235899 | A1* | 10/2006 | Tucker | G06F 16/214 |
| 2007/0226196 | A1* | 9/2007 | Adya | G06F 16/24539 |
| 2008/0027769 | A1* | 1/2008 | Eder | G06Q 40/12 705/7.28 |
| 2008/0082987 | A1* | 4/2008 | Mao | H04L 67/02 719/313 |

(Continued)

*Primary Examiner* — Leslie Wong
(74) *Attorney, Agent, or Firm* — Hunton Andrews Kurth LLP

(57) ABSTRACT

An embodiment of the present invention is directed to implementing machine learning to define business logic and lineage. The system analyzes data patterns of SORs as well as consumption attributes to define the business logic. An embodiment of the present invention may achieve over 95% match rate for complex attributes. When provided with thousands of SOR attributes, the innovative system may identify a handful of relevant SOR attributes required as well as the business logic to derive the consumption attribute.

18 Claims, 6 Drawing Sheets

(56) References Cited

U.S. PATENT DOCUMENTS

| | | | | |
|---|---|---|---|---|
| 2012/0095957 A1* | 4/2012 | Reddy | ............... | G06F 16/24535 |
| | | | | 707/602 |
| 2012/0124086 A1* | 5/2012 | Song | .................... | G06F 40/154 |
| | | | | 707/769 |
| 2012/0150939 A1* | 6/2012 | Zaifman | ............. | G06F 9/45512 |
| | | | | 709/203 |
| 2014/0372346 A1* | 12/2014 | Phillipps | ................ | G06N 20/00 |
| | | | | 706/12 |
| 2015/0134589 A1* | 5/2015 | Marrelli | ............... | G06F 16/258 |
| | | | | 707/602 |
| 2015/0227838 A1* | 8/2015 | Wang | ..................... | G06N 20/00 |
| | | | | 706/12 |
| 2015/0293946 A1* | 10/2015 | Fong | ..................... | G06F 16/288 |
| | | | | 707/811 |
| 2018/0052861 A1* | 2/2018 | Seetharaman | ........ | G06F 3/0649 |
| 2018/0247222 A1* | 8/2018 | Tolomei | ................. | G06N 20/20 |
| 2018/0285391 A1* | 10/2018 | Juneja | .................. | G06F 40/242 |
| 2018/0341839 A1* | 11/2018 | Malak | ..................... | G06F 40/30 |
| 2019/0012876 A1* | 1/2019 | Brahmandam | ..... | G07F 17/3234 |
| 2020/0167323 A1* | 5/2020 | Swamy | .................. | G06F 16/27 |

* cited by examiner

SYSTEM AND METHOD FOR IDENTIFYING BUSINESS LOGIC AND DATA LINEAGE WITH MACHINE LEARNING

CROSS REFERENCE TO RELATED APPLICATIONS

This application claims priority to U.S. Provisional Application 62/551,923, filed Aug. 30, 2017, the contents of which are incorporated herein in its entirety.

FIELD OF THE INVENTION

The invention relates generally to a system and method for identifying business logic and data lineage with machine learning and generating corresponding pseudo code.

BACKGROUND OF THE INVENTION

Legacy systems include a huge amount of historical data that was built over many years by many different teams. Because such systems were implemented many years, if not, decades ago by employees who are no longer with a company, there is little to no documentation regarding the system and updates. For companies with such legacy systems, there are millions and millions of attributes that need to be decommissioned and built into target state attributes. This is particularly challenging when migrating from legacy systems to modern solutions. With this migration, a significant challenge is defining the business logic for each attribute. Current systems lack an efficient way to define business logic for consumption attributes.

It is currently not possible to reverse engineer business logic from historical code. Some legacy systems were built in layers over 20 years with no governance, controls or documentation. Any effort to reverse engineer lineage from consumption attribute to a system of record (SOR) has failed because of the number of layers of complicated code. For example, an attempt to document lineage for CATEGORY_CODE was abandoned after it was found that the lineage to SOR could not be defined even after digging 7,000 layers deep into the legacy code.

Moreover, there is limited business subject matter expert (SME) knowledge to define business logic. Business SMEs that can define business logic are limited and time constrained, it takes a very long time to define a single complex attribute. For example, the business logic for an exemplary CATEGORY_CODE could not be completed after 1 week of dedicated effort by 10 business and IT SMEs.

These and other drawbacks exist.

SUMMARY OF THE INVENTION

According to one embodiment, the invention relates to a system that generates data logic to transform data from a legacy system to a target system. The system comprises: a database interface that receives data from one or more legacy systems; an interactive user interface that communicates with a user via a communication network; and a computer server comprising a programmed computer processor, coupled to the database interface and the interactive user interface, configured to perform the steps of: identifying, via the interactive user interface, an input comprising a source link, a target attribute and an algorithm; extracting, via the database interface, one or more datasets from the one or more legacy systems using the source link; identifying, via the computer server, one or more correlated features associated with the target attribute; generating one or more recommended factors that impact the target attribute; generating a target mapping model; applying the target mapping model to determine one or more correlations between the one or more legacy systems and the target system; and automatically generating a pseudo code based on the one or more correlations.

According to another embodiment, a method that generates data logic to transform data from a legacy system to a target system comprises the steps of: identifying, via an interactive user interface, an input comprising a source link, a target attribute and an algorithm; extracting, via a database interface, one or more datasets from the one or more legacy systems using the source link, wherein the database interface that receives data from one or more legacy systems; identifying, via a computer server, one or more correlated features associated with the target attribute, wherein the computer server comprises a programmed computer processor, coupled to the database interface and the interactive user interface; generating one or more recommended factors that impact the target attribute; generating a target mapping model; applying the target mapping model to determine one or more correlations between the one or more legacy systems and the target system; and automatically generating a pseudo code based on the one or more correlations.

According to another embodiment, a system that generates pseudo code that represents data logic from a source system to a target system, comprises: a computer server comprising a programmed computer processor configured to perform the steps of: preprocessing source data using direct SQL and creating a create comma separated values (CSV) file with header columns and target columns; processing the CSV file using dataframes; identifying a set of best source feature attributes using recursive feature elimination method in machine learning; separating the attributes to continuous and categorical columns; feeding the attributes to a machine learning algorithm; and generating a descriptive tree path in pseudo code. The machine learning algorithm may comprise a decision tree algorithm, a regression algorithm, or a Gaussian algorithm.

The system may include a specially programmed computer system comprising one or more computer processors, interactive interfaces, electronic storage devices, and networks.

The computer implemented system, method and medium described herein provide unique advantages to entities, organizations and other users, according to various embodiments of the invention. An embodiment of the present invention is directed to analyzing data patterns using machine learning to generate pseudo code that represents data lineage logic. The innovative system may receive millions of lines of code from a legacy system, analyze data patterns and identify corresponding logic that may then be used to re-implement in modern technology. In addition, the system may be used to provide auditors, regulators as well as internal teams a clear lineage from legacy systems to modern technology in response to regulatory inquiries and requirements. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
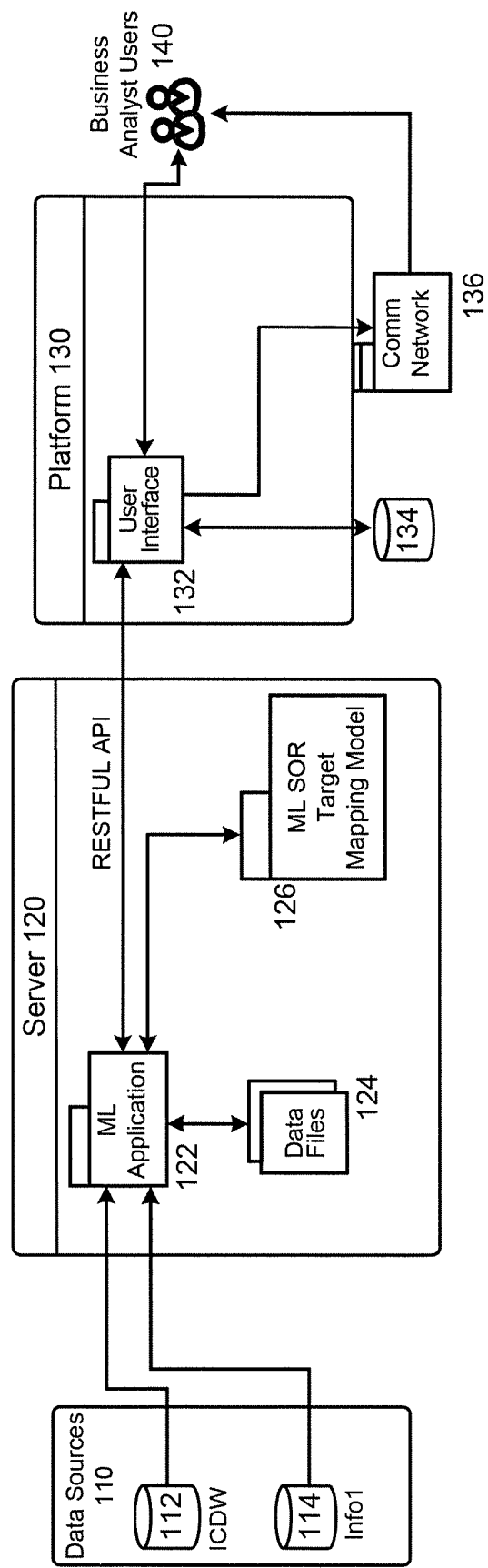
FIG. 1 is an exemplary system diagram that identifies data lineage, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to defining business logic and lineage based on data patterns from legacy systems to target systems. An embodiment of the present invention may receive inputs from a source system and identify corresponding business logic for a target system that is disparate from the source system. The innovation analyzes data patterns of SORs as well as consumption attributes to define the business logic. In the example concerning CATEGORY_CODE, when provided with thousands of SOR attributes as an input, the innovative system may identify a subset of relevant SOR attributes and then generate the business logic to derive the consumption attribute. Based on the attributes and/or types of attributes, an algorithm may be applied to generate business logic.

In an illustrative example involving mortgage loans, an exemplary attribute may represent "loan status." The exemplary attribute may include a plurality of values, represented by A, B, C, D and E. The system may recognize that loan status may be represented in a number of different ways in various different legacy systems, applications and channels. In the first legacy system, the attribute values may be represented by 1, 2, 3, 4, 5, 6 . . . 20. In a second legacy system, the attribute values may be represented in a different manner, such as A1, A2, A3, B1, B2, B3 . . . E3. The legacy systems may also implement various communication channels. An embodiment of the present invention may analyze the target attribute values (A, B, C, D, and E) with the legacy attribute values and identify a corresponding business logic. When applied to a large entity, such as a financial institution, there may be millions and millions of loan mortgages over the past several decades.

An embodiment of the present invention is directed to implementing machine learning algorithms to infer relevant lineage as well as business logic resulting in significant efficiency gains. Also, decision tree algorithms may be used for discrete data attributes and multiple interaction regression algorithms may be used for continuous data attributes.

An embodiment of the present invention may be applied to large data sets in a manner that enables various users, even users without an understanding of machine learning concepts, to interact with the innovative system. For example, an interactive user interface may be provided that enables a user to identify an attribute used in legacy system and automatically generate corresponding business logic that may be used in implementation to another target system. The interactive user interface may also provide reports, analysis, queries and outputs in various formats.

FIG. 1 is an exemplary system diagram that identifies data lineage, according to an embodiment of the present invention. As shown in FIG. 1, Data Sources 110 may represent systems of records. In this example, legacy systems may be represented by database systems. For example, database systems may represent an Integrated Consumer Data Warehouse (ICDW). Server 120 may execute a machine learning application at 122 that communicates with Data Files 124. For example, Data Files 124 may represent comma separated values (CSV) files with columns as well as other file formats. Server 120 may generate a target mapping model at 126. Platform 130 may represent a cloud or other platform that communicates with users, such as business analyst users 140. Platform 130 may provide a portal or other user interface 132 that communicates with ML Application 122 via an API, such as Restful API. In addition, user interface 132 may communicate with users via a communication interface or network represented by 136. Platform 130 may support various data sources, represented by Data Store 134.

According to an exemplary embodiment, a user may utilize User Interface (UI) 132 to provide driving information for a data lineage process. This may include providing or otherwise identifying data relating to a source, data set and/or hyper-parameters. Hyper parameters may represent options given to a decision tree model. For example, hyper parameters may represent how many nodes (branches) a tree may have, how many leaf nodes at each branch and the depth of the tree. Data may be extracted from legacy systems, represented by 112, 114 and pre-formatted for a Machine Learning Application, represented by 122. Machine Learning Model, represented by 126, may be used to determine highly correlated factors. An embodiment of the present invention may then generate recommended factors and engage the user through a notification via communication network 136. This may occur via an email notification or other mode of communication. The user may review and modify recommendations to align with a current interrogation of the data set. For example, recommendations may represent possible input parameters for a given output variable. In this scenario, a user may add new parameters to the model as input parameters. This may occur if user thinks there are some input parameters missing in an algorithm recommendation. Machine Learning Model 126 may run against the data set with the hyper-parameters provided to assist in the determination of SOR columns correlations with dependent features. Output of Machine Learning Model 126 may then be sent to User 140 through communication network 136. This process can be repeated multiple times until the data set is fully interrogated.

Figure 2:
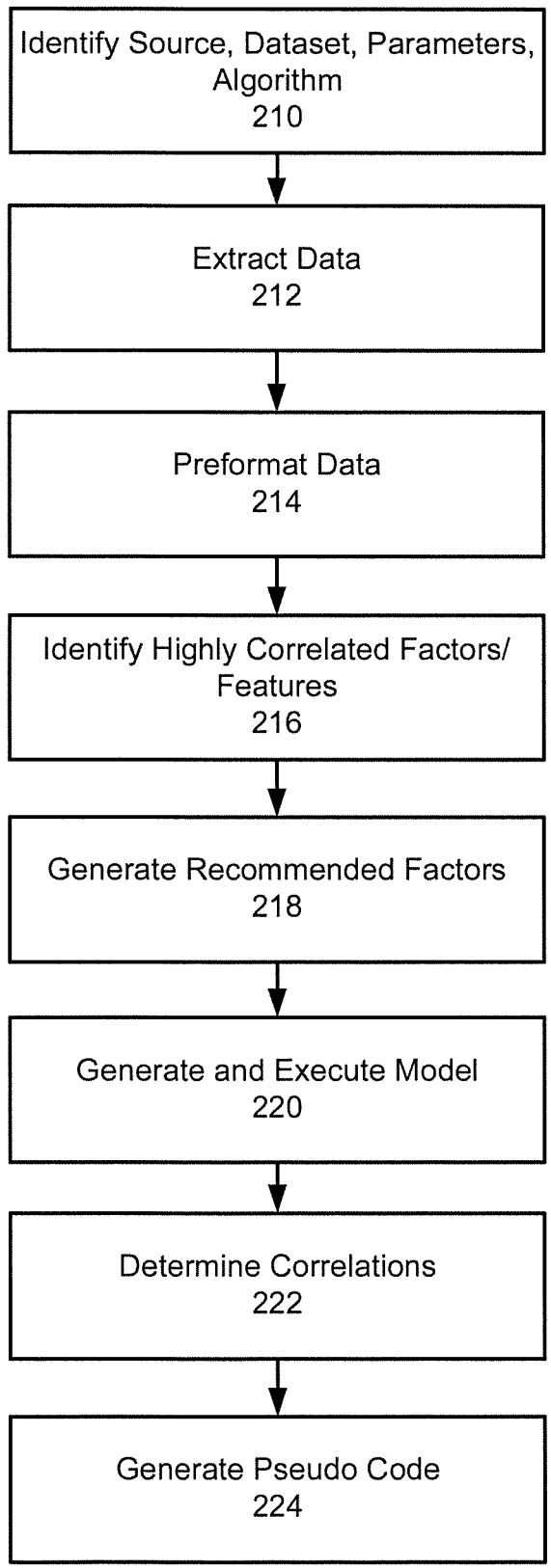
FIG. 2 is an exemplary flowchart that illustrates a data lineage process, according to an embodiment of the present invention.

FIG. 2 is an exemplary flowchart that illustrates a data lineage process, according to an embodiment of the present invention. At step 210, source, dataset, hyper parameters and algorithm may be identified. At step 212, data may be extracted. At step 214, the extracted data may be preformatted. At step 216, highly correlated factors may be identified. At step 218, recommended factors may be generated. At step 220, a model may be generated using the algorithm. At step 222, correlations may be determined with dependent features. At step 224, pseudo code may be generated. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed.

At step 210, source, dataset and hyper parameters may be identified. In addition, an algorithm may be selected. The source may be identified by a link or other location of a file. The algorithm may be selected as a decision tree, regression, Gaussian algorithm and/or other algorithm. A decision tree algorithm may be selected for discrete variables while a regression algorithm may be selected for continuous variables. Other algorithms may be available. In addition, an embodiment of the present invention may automatically apply an optimal algorithm to the datasets based on the various inputs and other considerations. Other inputs may also include feature count and/or other limits and boundaries.

An embodiment of the present invention may be applied to files at various locations and systems, including SQL databases and/or other sources. In this example, the inputs may also include a query string, which may be selected from a table or other source.

At step 212, data may be extracted. Datasets may be extracted from the source location. The extracted data may include features, attributes inputs, etc.

At step 214, the extracted data may be preformatted. The datasets may be formatted for machine learning analysis.

At step 216, highly correlated factors may be identified. An embodiment of the present invention may determine a subset of highly relevant factors, features and/or variables. For example, a larger set of features may be received as an input. From this larger set of features, an embodiment of the present invention may identify a subset of features that are most impactful relative to the remaining features. For example, highly correlated represents how much a change in output value changes the input values. If the input variable values are not changing with the output, it may be considered a low correlated value.

Figure 5:
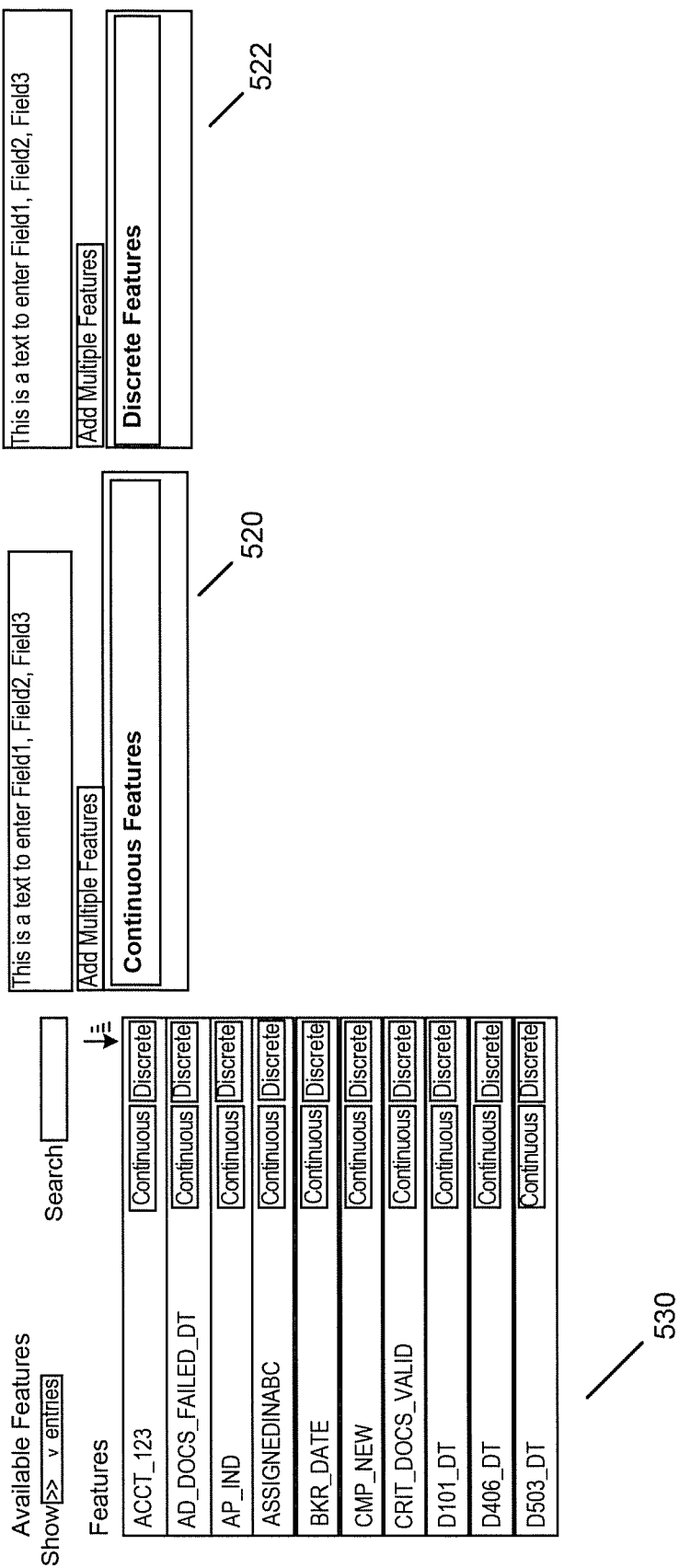
FIG. 5 is an exemplary user interface, according to an embodiment of the present invention.

The system may further generate possible features to be used in determining a dependent label. For example, a user may requested to select continuous and discrete features from a set of available features. FIG. 5 below provides additional details.

At step 218, recommended factors may be generated. An embodiment of the present invention may present the highly correlated factors as recommended factors via a user interface to the user. The user may then confirm or reject the recommended factors. According to another example, an embodiment of the present invention may automatically apply the recommended factors. Other variations may be applied.

In addition, an embodiment of the present invention may further categorize the recommended factors, source attributes, etc.

At step 220, a model may be generated using the algorithm. For example, the highly correlated factors may be applied to generate the model. The model may be executed on a dataset with hyper parameters. An embodiment of the present invention may apply machine learning to generate a model that applies and executes logic to the dataset.

At step 222, correlations may be determined with dependent features. In this steps, SOR columns correlations with dependent features may be determined. For example, correlated input values (e.g., SOR, Source) may be determined based on the output value.

The process may be repeated and further refined.

Figure 6:
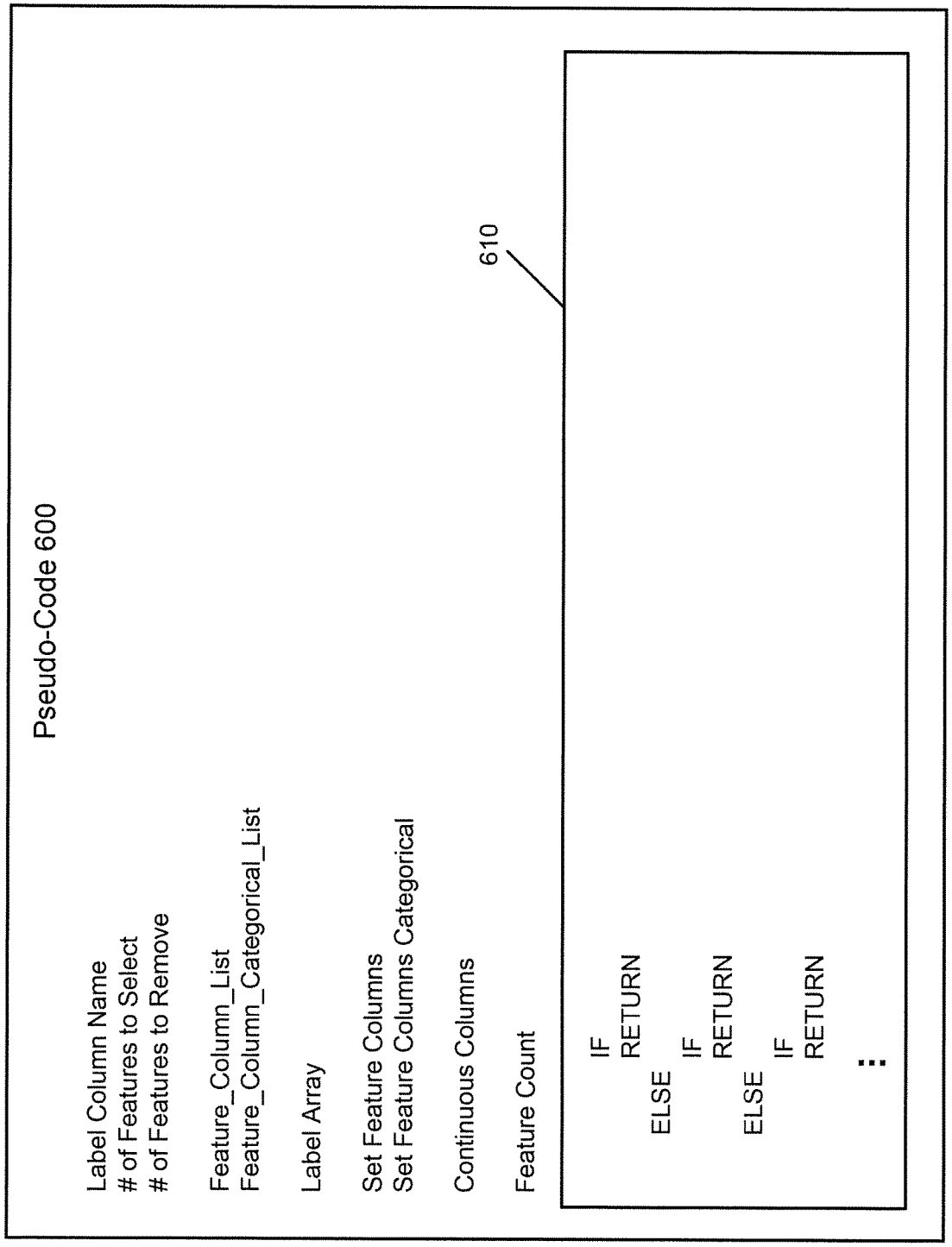
FIG. 6 is an exemplary pseudocode, according to an embodiment of the present invention.

At step 224, pseudo code may be generated. The pseudo code may be provided via an interactive user interface and may be implemented or executed on a target system. The pseudo code may include various formats, including IF/THEN statements. FIG. 6 below provides additional details.

Figure 3:
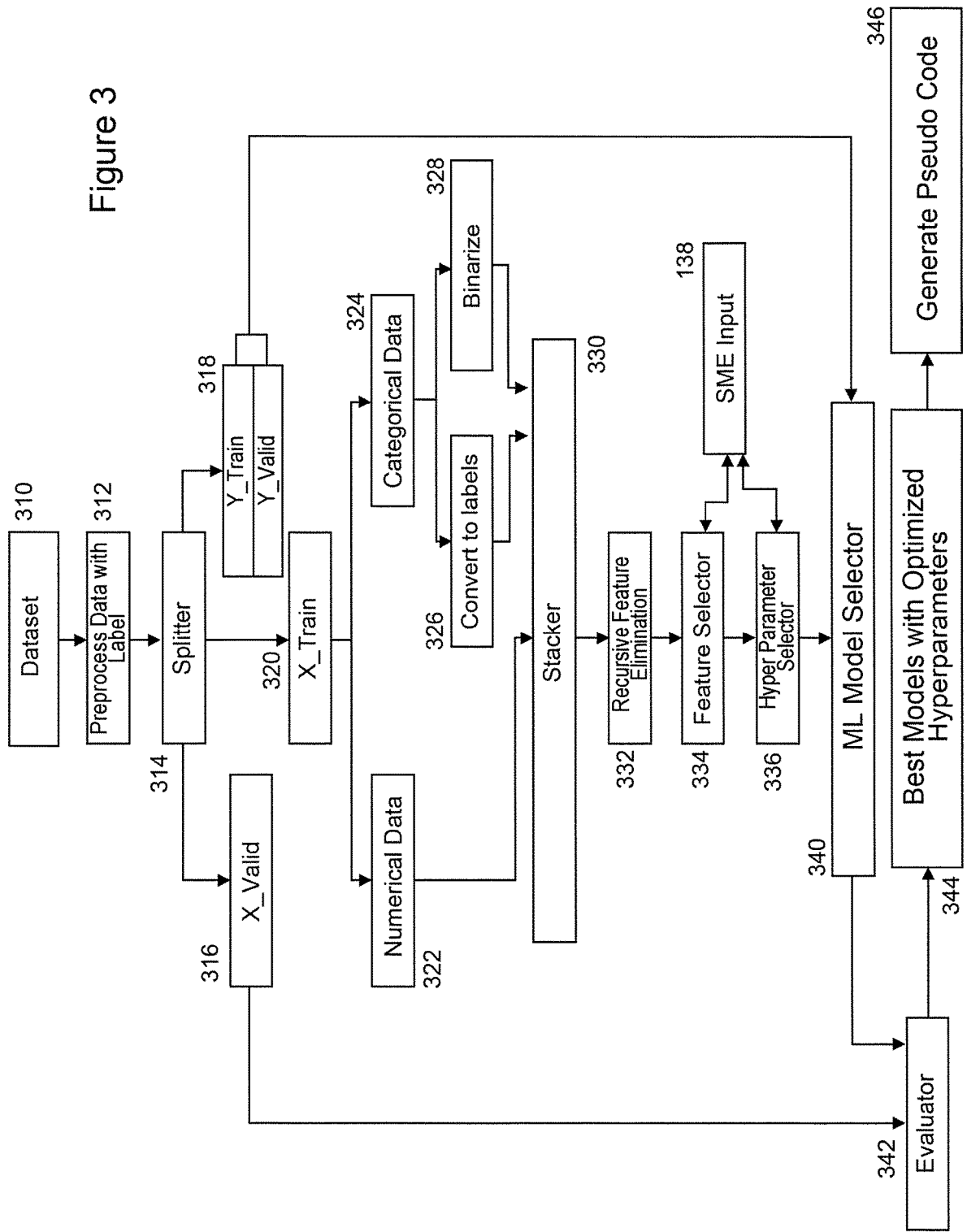
FIG. 3 is an exemplary flowchart illustrating a process flow that generates pseudo code, according to an embodiment of the present invention.

FIG. 3 is an exemplary flowchart illustrating a process flow that generates pseudo code, according to an embodiment of the present invention. For example, the process flow may generate pseudo code to decompose Relationship Manager (RM) Category Code (e.g., load status, etc.) from a set of source attributes, e.g., over 200 source attributes. The process may involve preprocessing a Source Data using direct SQL and create comma separated values (CSV) file with header columns along with target column. Other formats may be used. Next, CSV may be processed using dataframes, such as Pandas Dataframes. Pandas is an open source library providing high performance data structures and data analysis tools for python programming language. A set of best source feature attributes may be identified using an elimination method, such as RFE (Recursive Feature Elimination) method in Machine Learning (ML). Recursive feature elimination may refer to repeatedly constructing a model (e.g., support vector machine (SVM) or a regression model) and choose either the best or worst performing feature (for example based on coefficients), setting the feature aside and then repeating the process with the rest of the features. The attributes may be separated to continuous and categorical (e.g., code types) columns. The best selected features may be fed to a machine learning (ML) Decision Tree Algorithm. Decision tree learning represents a predictive modeling approach that may be used in machine learning. Decision tree learning uses a decision tree (as a predictive model) to go from observations about an item (represented in the branches) to conclusions about the item's target value (represented in the leaves). A Descriptive Decision Tree Path may be generated in pseudo code. A Decision Tree Logic may be tested for accuracy (e.g., approximately >95%). The Tree may be pruned until the results are satisfactory (e.g., reach a threshold, achieve a desired accuracy rate, etc.).

At step 310, a dataset may be identified. At step 312, data may be preprocessed with a label. At step 314, a splitter may be applied to the data to result in X_Valid, at 316 and Y_Train and Y_Valid, at step 318 and X_Train at 320. X_Train data may be divided into numerical data 322 and categorical data 324. Category data 324 may be converted to labels at 326 and represented in binary form at 328. Data may be fed into Stacker 330. This may involve data collection of transformed features and/or variables. Recursive feature elimination may be applied at 332. Feature selector may be applied at 324 and Hyper parameter selector may be applied at 336, via subject matter expert (SME) input 338. ML Model Selector 340 may be applied. Data may be received at Evaluator 342 where best models with optimized hyperparameters are identified at 344. Pseudo code may be generated at 346. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
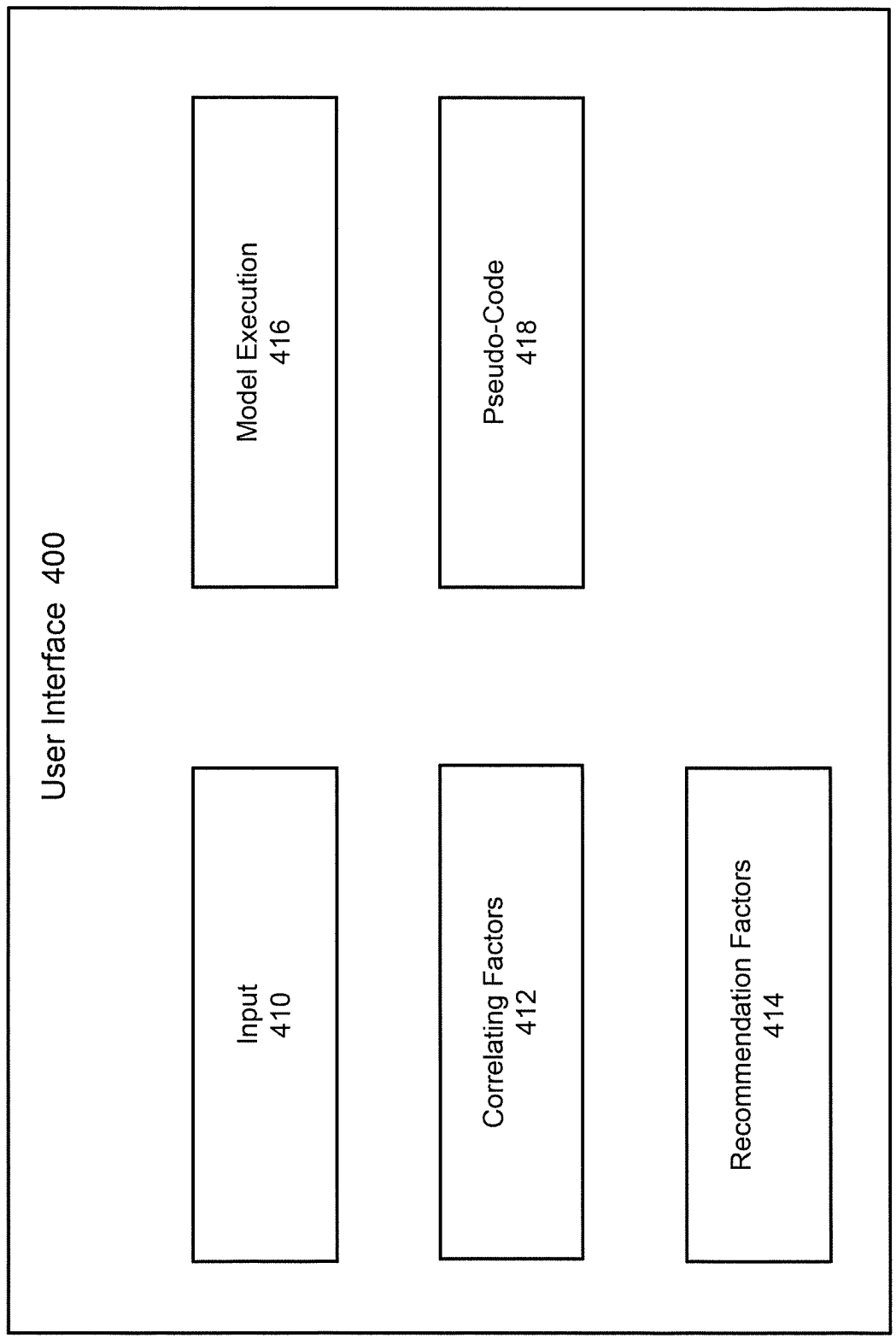
FIG. 4 is an exemplary illustration of a user interface, according to an embodiment of the present invention.

FIG. 4 is an exemplary illustration of a user interface, according to an embodiment of the present invention. A user may interact with an embodiment of the present invention through a user interface. The user interface may include an Input 410, Correlating Factors 412, Recommendation Factors 414, Model Execution 416 and Code 418.

At Input 410, a user may provide a label to predict, dataset or file location and hyper parameters. The user may also identify an algorithm, such as a decision tree, regression, etc. At Correlating Factors 412, the system may identify one or more correlating factors. At Recommendation Factors 414, the system may identify additional factors. The user may then confirm or reject the recommended factors. At Model Execution 416, the system may execute a model. At Pseudo-Code 418, the system may provide code that represents logic. The code may be in the form of IF and THEN statements. Other code formats may be provided.

FIG. 5 is an exemplary user interface, according to an embodiment of the present invention. As shown in FIG. 5, the system may identify a predicting label and an algorithm. In this example, the predicting label is "RM_Category" and the algorithm is a "Decision Tree," as shown by 510. For each available feature, the system may request additional input from the user. In this example, the user may select continuous features (as shown by 520) and discrete features (as shown by 522) from the available features panel at 530. Continuous features may represent a variable with an infinite number of possible values. Discrete features may represent a variable with a finite number of possible values. Discrete features can take on a certain number of values, such as quantitative values.

The user may then confirm the features as input variables. An embodiment of the present invention may evaluate the features selected. The system may then identify additional features that have a larger impact relative to the remaining features. The system may identify features to the user, via an interactive interface, as continuous feature and discrete features.

FIG. 6 is an exemplary pseudocode, according to an embodiment of the present invention. The exemplary pseudocode illustrated in FIG. 6 represents business logic that may be applied to a first system to result in a target system. According to one example, the system may facilitate migration from a legacy system to a modern system. The exemplary logic may identify highly correlated variables and further provide pseudocode to implement and/or execute the pseudocode in various target systems. For example, the logic may include a series of IF/THEN statements, as shown by 610. The logic may also include nested and complex formats. Other formats may be generated and applied.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, JavaScript and/or Python. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that generates data logic to transform data from a legacy system to a target system, the system comprising:
    a database interface that receives data from one or more legacy systems;
    an interactive user interface that communicates with a user via a communication network; and
    a computer server comprising a programmed computer processor, coupled to the database interface and the interactive user interface, configured to perform the steps of:
    identifying, via the interactive user interface, one or more datasets, a source for the one or more datasets comprising a source link, a target attribute, and one or more parameters relating to the target attribute or a source identified by the source link;
    automatically selecting an algorithm based on the target attribute and the one or more parameters, where the algorithm type is a decision tree algorithm when the target attribute comprises one or more discrete values and a multiple interaction regression algorithm when the target attribute comprises continuous values;
    extracting, via the database interface, the one or more datasets from the one or more legacy systems using the source link the one or more datasets including a plurality of factors associated with the target attribute and one or more attribute inputs;
    formatting, via the computer server, the one or more datasets for a machine learning analysis;
    analyzing, through the machine learning analysis, the response of the target attribute to each of the plurality of factors by varying the values of each factor and observing the change in the target attribute;
    determining, by the machine learning analysis, a subset of highly correlated factors from the plurality of factors associated with the target attribute based on the analyzed response of the target variable, where highly correlated is determined based on a threshold for the impact that each of the plurality of factors has on the target value;
    generating, via the machine learning analysis, one or more recommended factors that impact the target attribute based on the identified subset of highly correlated factors;
    receiving user feedback on the one or more recommended factors, wherein the feedback comprises acceptance or rejection of one or more of the recommended factors as well as addition of one or more additional factors;
    generating a target mapping model using the selected algorithm and based on the one or more recommended factors and the user feedback;
    applying the target mapping model to determine one or more correlations between the one or more legacy systems and the target system; and
    automatically generating a pseudo code based on the one or more correlations.

2. The system of claim 1, wherein the computer server is further configured to perform the step of:
    formatting, via the computer server, the extracted one or more datasets.

3. The system of claim 1, wherein the one or more recommended factors are confirmed by the user via the interactive user interface.

4. The system of claim 1, wherein the algorithm comprises one or more of: a decision tree algorithm, a regression algorithm, and a Gaussian algorithm.

5. The system of claim 1, wherein the pseudo code comprises a descriptive logical tree path.

6. The system of claim 1, wherein the pseudo code comprises a series of IF THEN statements.

7. The system of claim 1, wherein the pseudo code is displayed on the interface user interface and automatically executed in the target system.

8. The system of claim 1, wherein the one or more correlated features represent an impact on the target attribute.

9. The system of claim 1, wherein the input comprises hyper-parameters.

10. A method that generates data logic to transform data from a legacy system to a target system, the method comprising the steps of:
    identifying, via the interactive user interface, one or more datasets, a source for the one or more datasets comprising a source link, a target attribute, and one or more parameters relating to the target attribute or a source identified by the source link;
    automatically selecting an algorithm based on the target attribute and the one or more parameters, where the algorithm type is a decision tree algorithm when the target attribute comprises one or more discrete values and a multiple interaction regression algorithm when the target attribute comprises continuous values;

extracting, via a database interface, the one or more datasets from the one or more legacy systems using the source link the one or more datasets including a plurality of factors associated with the target attribute and one or more attribute inputs, wherein the database interface receives data from one or more legacy systems;

formatting, via the computer server, the one or more datasets for a machine learning analysis;

analyzing, through the machine learning analysis, the response of the target attribute to each of the plurality of factors by varying the values of each factor and observing the change in the target attribute;

determining, by the machine learning analysis, a subset of highly correlated factors from the plurality of factors associated with the target attribute based on the analyzed response of the target variable, where highly correlated is determined based on a threshold for the impact that each of the plurality of factors has on the target value;

generating, via the machine learning analysis, one or more recommended factors that impact the target attribute based on the identified subset of highly correlated factors;

receiving user feedback on the one or more recommended factors, wherein the feedback comprises acceptance or rejection of one or more of the recommended factors as well as addition of one or more additional factors;

generating a target mapping model using the selected algorithm and based on the one or more recommended factors and the user feedback;

applying the target mapping model to determine one or more correlations between the one or more legacy systems and the target system; and automatically generating a pseudo code based on the one or more correlations.

11. The method of claim 10, further comprising the step of:

formatting, via the computer server, the extracted one or more datasets.

12. The method of claim 10, wherein the one or more recommended factors are confirmed by the user via the interactive user interface.

13. The method of claim 10, wherein the algorithm comprises one or more of: a decision tree algorithm, a regression algorithm, and a Gaussian algorithm.

14. The method of claim 10, wherein the pseudo code comprises a descriptive logical tree path.

15. The method of claim 10, wherein the pseudo code comprises a series of IF THEN statements.

16. The method of claim 10, wherein the pseudo code is displayed on the interface user interface and automatically executed in the target system.

17. The method of claim 10, wherein the one or more correlated features represent an impact on the target attribute.

18. The method of claim 10, wherein the input comprises hyper-parameters.

* * * * *